(12) United States Patent
Akieda et al.

(10) Patent No.: US 7,436,396 B2
(45) Date of Patent: Oct. 14, 2008

(54) HAPTIC PANEL APPARATUS

(75) Inventors: Shinichiro Akieda, Shinagawa (JP);
Junichi Akama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 478 days.

(21) Appl. No.: 11/100,390

(22) Filed: Apr. 7, 2005

(65) Prior Publication Data
US 2006/0109254 A1    May 25, 2006

(30) Foreign Application Priority Data
Nov. 19, 2004    (JP) .............................. 2004-336491

(51) Int. Cl.
*G06F 3/041* (2006.01)
*G09G 5/00* (2006.01)

(52) U.S. Cl. ....................... 345/173; 345/156

(58) Field of Classification Search ......... 345/173–179, 345/156; 178/18.01–18.11, 19.01–19.07; 715/701, 702
See application file for complete search history.

(56) References Cited

U.S. PATENT DOCUMENTS

| | | | |
|---|---|---|---|
| 6,337,678 B1 * | 1/2002 | Fish | 345/156 |
| 6,747,631 B1 * | 6/2004 | Sakamaki et al. | 345/157 |
| 6,822,635 B2 * | 11/2004 | Shahoian et al. | 345/156 |
| 2002/0033795 A1 * | 3/2002 | Shahoian et al. | 345/156 |
| 2003/0067449 A1 * | 4/2003 | Yoshikawa et al. | 345/173 |
| 2003/0179190 A1 * | 9/2003 | Franzen | 345/173 |
| 2004/0178996 A1 * | 9/2004 | Kurashima et al. | 345/173 |
| 2004/0183788 A1 * | 9/2004 | Kurashima et al. | 345/173 |
| 2005/0038944 A1 * | 2/2005 | Harada et al. | 710/110 |
| 2005/0052430 A1 * | 3/2005 | Shahoian et al. | 345/173 |

FOREIGN PATENT DOCUMENTS

| | | |
|---|---|---|
| JP | 9-65636 | 3/1997 |
| JP | 9-331665 | 12/1997 |
| JP | 2002-200461 | 7/2002 |

* cited by examiner

*Primary Examiner*—Alexander Eisen
*Assistant Examiner*—Cory A Almeida
(74) *Attorney, Agent, or Firm*—Staas & Halsey LLP

(57) ABSTRACT

A haptic panel apparatus is disclosed that enables an operator to sense movement of a touch panel through touch when an input is made. The touch panel is accommodated within a base member, and an electromagnetic drive mechanism is provided between the touch panel and the base member. When the operator operates the touch panel with his/her fingertip and an input is made, the electromagnetic drive mechanism is driven to induce the touch panel to recede. In turn, the operator senses the receding of the touch panel through his/her fingertip to recognize that an input has been properly made.

8 Claims, 15 Drawing Sheets

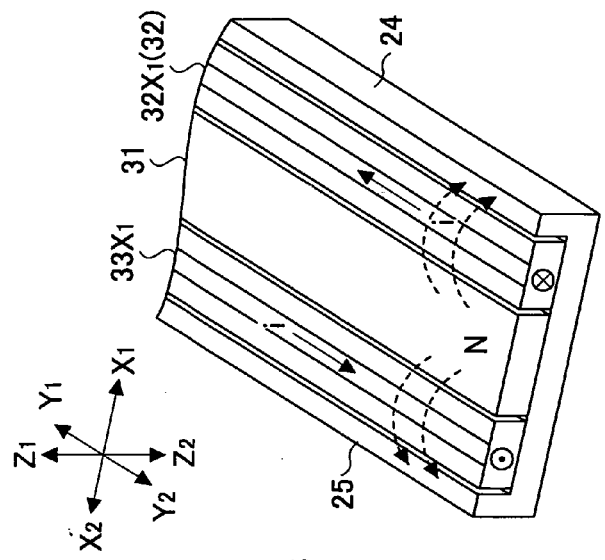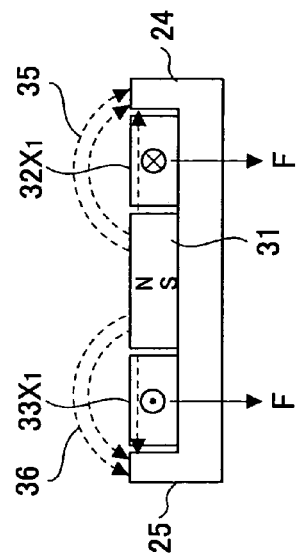
FIG.5C
FIG.5D
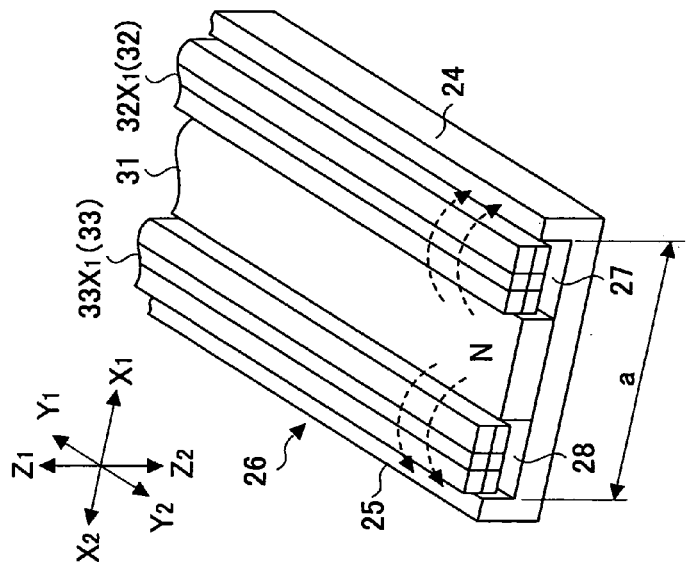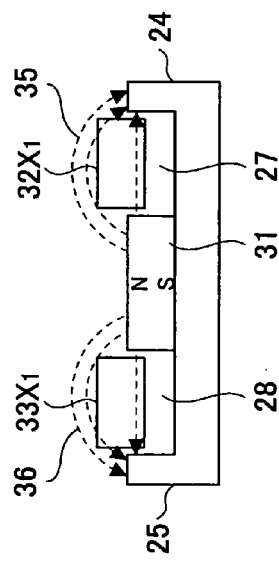
FIG.5A
FIG.5B

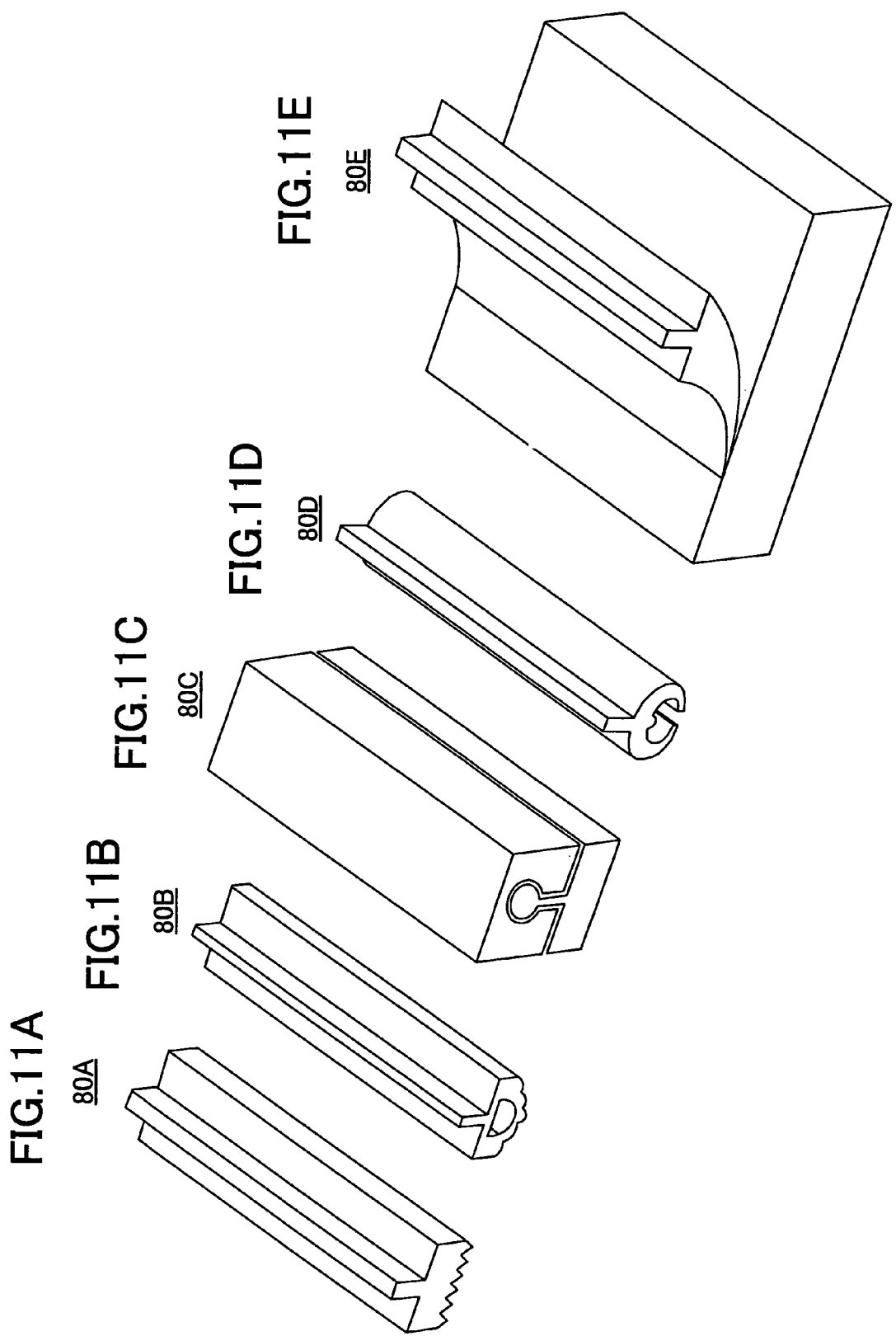

FIG.15
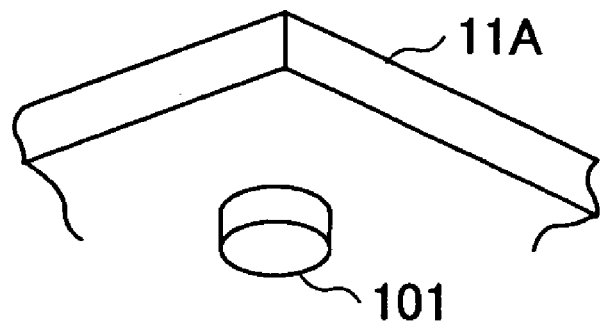
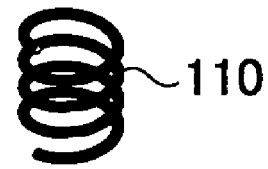
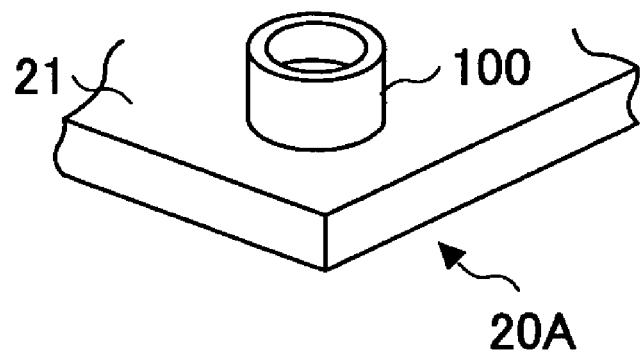

FIG.19
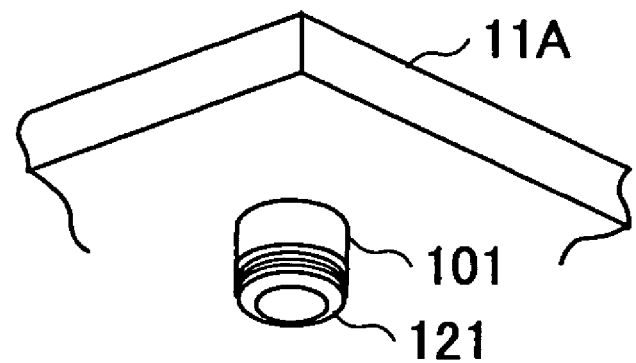
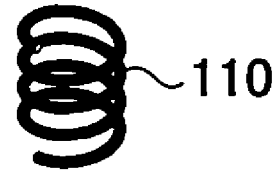
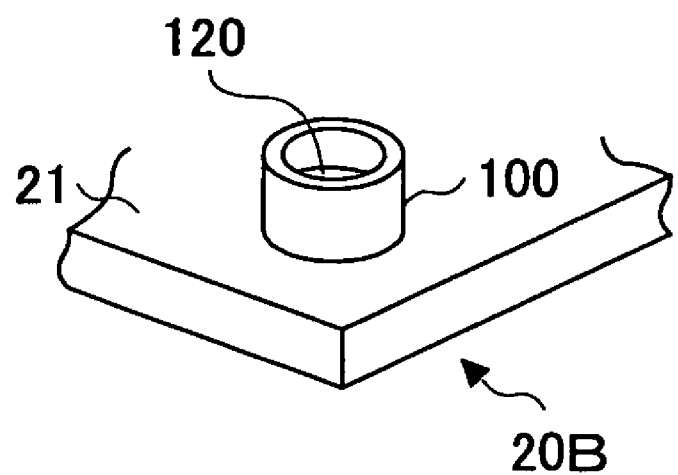

HAPTIC PANEL APPARATUS

BACKGROUND OF THE INVENTION

1. Field of the Invention

The present invention relates to a haptic panel apparatus that is arranged to sense an input made by a user when the user lightly presses on a touch panel with a finger tip.

2. Description of the Related Art

Generally, a touch panel is set on the surface of a liquid crystal display (LCD) panel. Such a touch panel has a very short stroke and provides no sense of clicking in response to an input made so that it is difficult for the operator of the apparatus to recognize that an input has been properly made. As one way of indicating to the user that an input has been received, a technique is known in which the LCD panel is arranged to change color when an input is recognized by the touch panel.

In such an arrangement, the LCD panel is driven to change color in response to an input made through the touch panel by the operator. In other words, the touch panel itself is not arranged to indicate to the operator that an input has been made. Also, in such an arrangement, a visually-impaired person may not be able to recognize that an input has been made.

SUMMARY OF THE INVENTION

Accordingly, it is an object of the present invention to provide a haptic panel apparatus that solves one or more of the problems of the related art. Specifically, it is an object of the present invention to provide a haptic panel apparatus that enables an operator operating a touch panel to recognize that an input has been properly made through haptic sense. It is another specific object of the present invention to provide a haptic panel apparatus that is suitable for conveying to visually-impaired persons that an input has been made.

According to an aspect of the present invention, a haptic panel apparatus is provided that includes:

a panel having a surface that is physically operated by an operator upon conducting an input operation; and a drive mechanism that operates when the input operation is conducted on the panel, the drive mechanism being configured to drive the panel to move in a perpendicular direction with respect to the surface of the panel.

According to an aspect of the present invention, when an operator conducts an input operation using his/her fingertip, the operator may be able to recognize that an input has been made through haptic sense at his/her fingertip.

According to an aspect of the present invention, by relying on the haptic sense of an operator, reception of an input may be suitably conveyed to visually impaired persons.

BRIEF DESCRIPTION OF THE DRAWINGS

FIGS. 5A~5D are diagrams showing a portion of electromagnetic drive mechanism of the haptic panel apparatus of FIG. 1, wherein FIGS. 5A and 5B show the state of the electromagnetic drive mechanism before operation, and FIGS. 5C and 5D show the state of the electromagnetic drive mechanism after operation;

FIGS. 11A~11E are diagrams illustrating modified examples of the seal member;

FIG. 15 is an exploded perspective view of the planar direction moving prevention mechanism of FIG. 13;

FIG. 19 is an exploded perspective view of the planar direction moving prevention mechanism of FIG. 17.

DESCRIPTION OF THE PREFERRED EMBODIMENTS

In the following, preferred embodiments of the present invention are described with reference to the accompanying drawings.

First Embodiment

First, a structure of a haptic panel apparatus according to a first embodiment of the present invention is described.

Figure 1:
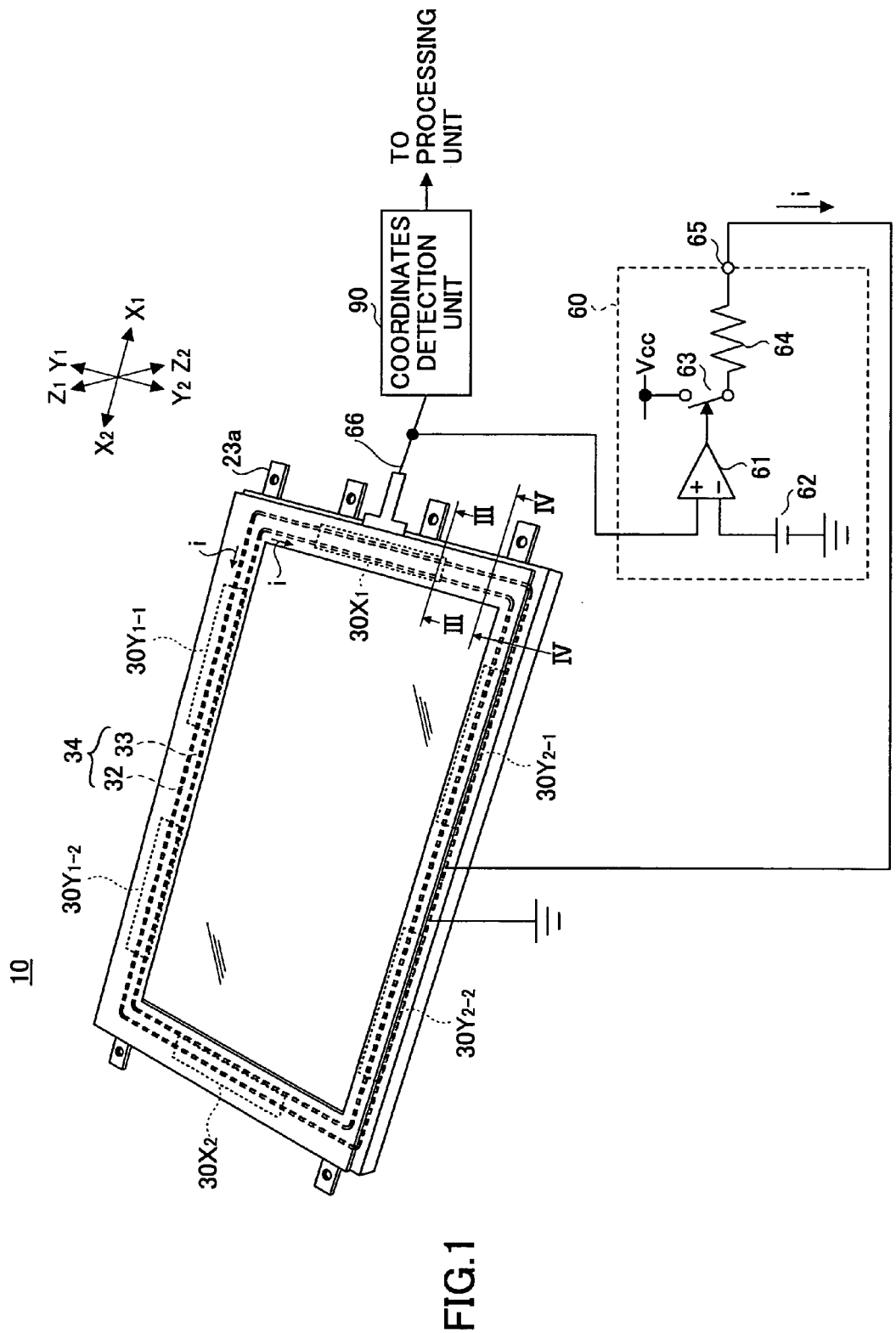
FIG. 1 is a diagram showing a configuration of a haptic panel apparatus according to a first embodiment of the present invention.
Figure 2:
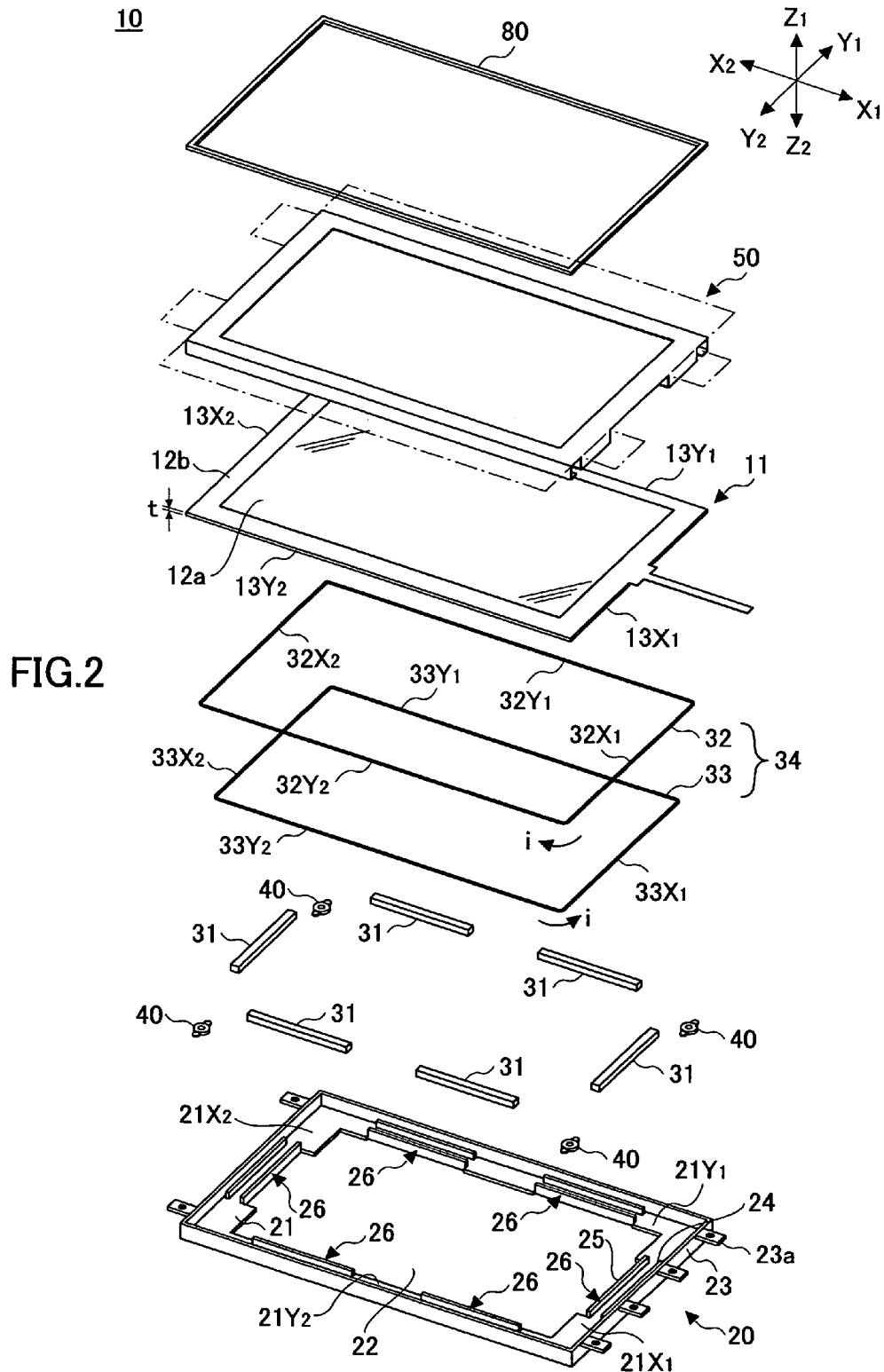
FIG. 2 is an exploded perspective view of the haptic panel apparatus of FIG. 1.
Figure 3:
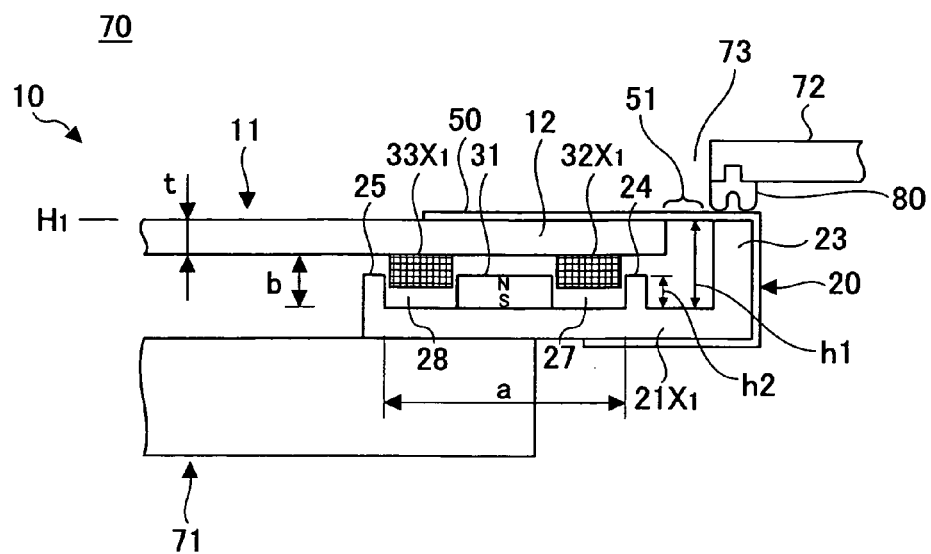
FIG. 3 is a cross-sectional view showing a state of a portion of an electromagnetic drive mechanism of the haptic panel of FIG. 1 across line III-III in a case where the haptic panel of FIG. 1 is mounted to an equipment.
Figure 4:
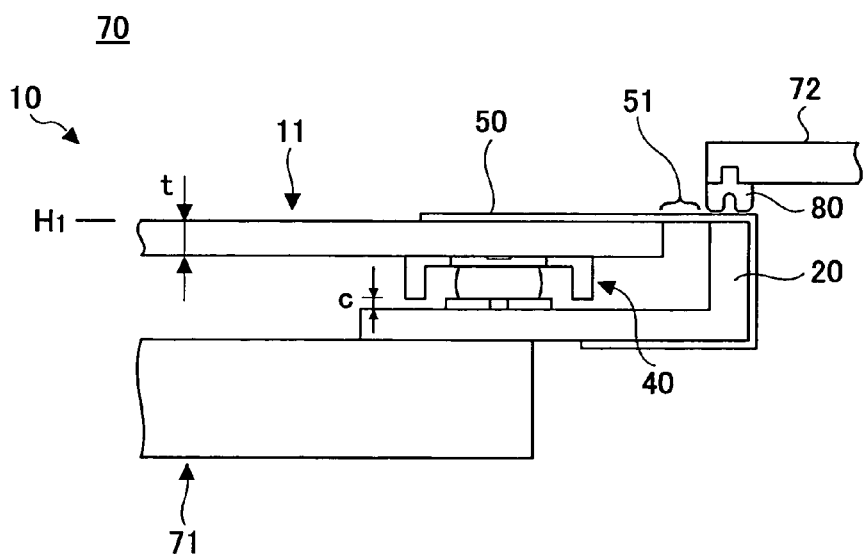
FIG. 4 is a cross-sectional view showing a state of a portion of the electromagnetic drive mechanism of the haptic panel of FIG. 1 across line IV-IV in a case where the haptic panel of FIG. 1 is mounted to an equipment.
Figure 6E:
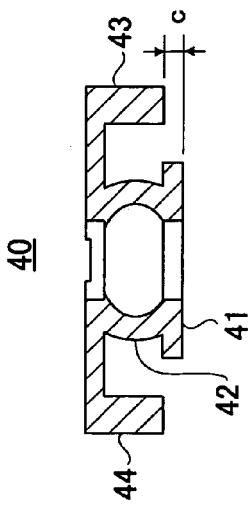
FIGS. 6A~6E are diagrams showing a configuration of a resurfacing assisting member shown in FIG. 2.
Figure 6B:
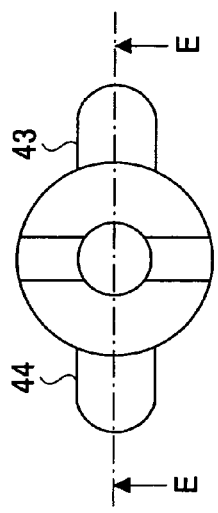
Figure 6C:
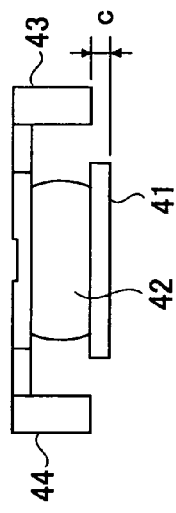
Figure 6D:
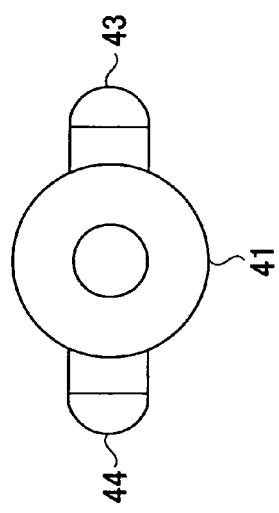
Figure 6A:
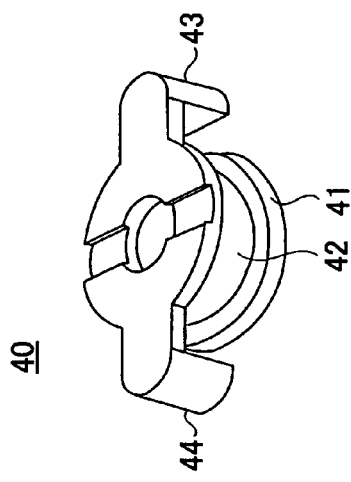

FIG. 1 is a perspective view showing a structure of a haptic panel apparatus according to a first embodiment of the present invention. FIG. 2 is an exploded perspective view of the haptic panel apparatus of FIG. 1. FIG. 3 is a cross-sectional view showing a portion of the haptic panel apparatus of FIG. 1 across line III-III. FIG. 4 is a cross-sectional view of a portion of the haptic panel apparatus of FIG. 1 across line IV-IV. It is noted that FIGS. 3 and 4 show the states of the haptic panel apparatus being mounted into an equipment structure. FIGS. 5A~5D are diagrams showing the structure of one of electromagnetic drive mechanisms of the haptic panel apparatus of FIG. 1. It is noted that in the above drawings, directions X1-X2 correspond to width directions, directions Y1-Y2 correspond to length directions, and directions Z1-Z2 correspond to depth directions of the haptic panel apparatus 10 of the present embodiment.

As is shown in FIG. 2, the haptic panel apparatus 10 includes a touch panel 11; a base member 20 into which the touch panel 11 is accommodated; electromagnetic drive mechanisms 30X1, 30X2, 30Y1-1, 30Y1-2, 30Y2-1, and 30Y2-2 placed between the touch panel 11 and the base member 20 that are arranged to induce the touch panel 11 to recede upon being operated; a control unit 60 that is arranged to supply a drive current to the electromagnetic drive mechanisms 30X1~30Y2-2 upon detecting that the touch panel 11 has been operated; and a coordinates detection unit 90. It is noted that an arbitrary one or more of the electromagnetic drive mechanisms 30X1~30Y2-2 is referred to as electromagnetic drive mechanism(s) 30 hereinafter.

According to the present example, the touch panel 11 is formed by a lower plate and an upper plate, and is arranged to have a thickness of t. The touch panel 11 includes an input operations portion 12a and a rim portion 12b surrounding the operations portion 12a. The touch panel 11 is defined by edges 13X1, 13X2, 13Y1, and 13Y2.

The base member 20 is a rectangular frame-shaped member having an outer periphery dimension that is arranged to be larger than the outer periphery dimension of the touch panel 11. The base member 20 includes a frame portion 21 that corresponds to the rim portion 12b, an opening portion 22 that corresponds to the size of the operations portion 12a, a peripheral rib 23 with height h1 that is provided around the outer periphery of the frame portion 21, and engaging lugs 23a protruding from the peripheral rib 23 in the X1 and X2 directions, respectively. The base member 20 functions as a housing for the touch panel 11. The frame portion 21 includes sections 21X1, 21X2, 21Y1, and 21Y2. The base member 20 is made of ferromagnetic material, and one or more pairs of ribs 24 and 25 are provided at each of the sections 21X1, 21X2, 21Y1, and 21Y2, respectively, the pair of ribs 24 and 25 extending in parallel directions with respect to the lengthwise directions of each of the sections 21X1, 21X2, 2lY1, and 21Y2. It is noted that the pair of ribs 24 and 25 functions as a yoke 26 for each of the electromagnetic drive mechanisms 30X1~30Y2-2. In the present example, the distance between the pair of ribs 24 and 25 is denoted as a, and the height of the ribs 24 and 25 is denoted as h2. As is described below, the distance a is arranged such that a permanent magnet 31 and first and second coil portions 32 and 33 may be accommodated between the ribs 24 and 25 in alignment. The difference between the height h1 of the peripheral rib 23 and height h2 of the ribs 24 and 25 is arranged to be slightly greater than the thickness t of the touch panel 11.

The permanent magnet 31 is arranged to extend between the ribs 24 and 25 with its upper surface corresponding to the N pole and the lower surface corresponding to the S pole. As is shown in FIG. 3 and FIGS. 5A and 5B, the permanent magnet 31 is positioned at the center portion of the space created between the ribs 24 and 25 within the frame portion 21. Trenches 27 and 28 are formed at the sides of the permanent magnet 31 within the space created between the ribs 24 and 25.

The first coil portion 32 and the second coil portion 33 are arranged into a rectangular shape corresponding to the shape of the touch panel 11. The first coil portion 32 is defined by edge portions 32X1, 32X2, 32Y1, and 32Y2, and the second coil portion 33 is defined by edge portions 33X1, 33X2, 33Y1, and 33Y2. The first coil portion 32 and the second coil portion 33 are concentrically arranged around the frame portion 21 and are spaced apart by a distance corresponding to the width of the permanent magnet 31. The first coil 32 and the second coil 33 are interconnected, and their winding directions are arranged to be in opposite directions with respect to each other so as to realize one coil 34.

On the corner portions of the upper surface of the frame portion 21, resurfacing assisting members 40 are provided.

Also, a water-resistant frame-shaped adhesive tape 50 is provided over the touch panel 11 and the base member 20. As is shown in FIGS. 3 and 4, the inner periphery portion of the adhesive tape 50 is arranged to be adhered to the top surface of the rim portion 12b of the touch panel 11. In a state where the touch panel 11 is accommodated within the base member 20, the outer periphery portion of the adhesive tape 50 is arranged to be adhered to the top and side surfaces of the peripheral rib 23 and the bottom surface of the frame portion 21 of the base member 20 to enclose the periphery portion of the base member 20. An overhanging portion 51 of the adhesive tape 50 corresponding to a frame-shaped portion bridging the gap between the outer periphery of the touch panel 11 and the peripheral rib 23 is provided stretched across the X-Y plane directions.

In the state where the touch panel 11 is accommodated within the base member 20, the outer periphery of the touch panel 11 is stretched outward so as to be hung over the base member 20 in a trampoline-like manner. Also, as is described in detail below, the touch panel 11 is supported by the resurfacing assisting members 40 arranged at the four corners of the frame member 20 so that the touch panel 11 may be spaced apart from the top surface of the frame member 21 by a distance b to be positioned at height h1, and the respective edge portions 32X1 and 33X1 of the first and second coil portions 32 and 33 may be engaged into the trenches 27 and 28, respectively, in a manner such that the bottom surface of the edge portions 32X1 and 33X1 are spaced apart from the bottom portion of the trenches 27 and 28, respectively (see FIG. 3). It is noted that the overhanging portion 51 extends around the entire periphery of the touch panel 11 and is also arranged to provide protection against dust and water infiltration.

Since the overhanging portion 51 is arranged to suspend the touch panel 11 outward with respect to the X-Y plane, the touch panel 11 may move in the Z2 direction by arranging the overhanging portion 51 to elastically stretch.

It is noted that the tension of the overhanging portion 51 and the rigidity of the resurfacing assisting member 40 may be suitably arranged such that the touch panel 11 may not move in the Z2 direction by the force of the coordinate input operation made by the operator, but may move in this direction to form a receded portion upon receiving a drive force in response to the operation of the electromagnetic drive mechanism 30.

It is noted that the permanent magnet 31, the first coil 32, the second coil 33, and the ribs 24 and 25 form the electromagnetic drive mechanism 30 of the present embodiment. In the present example, one electromagnetic drive mechanism 30X1 is provided at the X1 side edge of the touch panel 11, one electromagnetic drive mechanism 30X2 is provided at the X2 side edge of the touch panel 11, two electromagnetic drive mechanisms 30Y1-1 and 30Y1-2 are provided at the Y1 side edge of the touch panel 11, and two electromagnetic drive mechanisms 30Y2-1 and 30Y2-2 are provided at the Y2 side edge of the touch panel 11.

FIGS. 5A~5D show a structure of the electromagnetic drive mechanism 30X1 as a representative example of the electromagnetic drive mechanisms 30. It is noted that FIGS. 5A and 5B show states of the electromagnetic drive mechanism 30X1 before being operated. As is shown in FIG. 5B, a magnetic field 35 is generated between the permanent magnet 31 and the rib 24, and a magnetic field 36 is generated between the permanent magnet 31 and the rib 25. It is noted that the magnetic flux of the magnetic field 35 and the magnetic flux of the magnetic field 36 flow in opposite directions. The edge portion 32X1 of the first coil portion 32 is arranged across the magnetic field 35, and the edge portion 33X1 of the second coil portion 33 is arranged across the magnetic field 36. As is shown in FIGS. 5C and 5D, when a current flowing in the Y1 direction is applied to the edge portion 32X1 of the first coil portion 21 and a current flowing in the Y2 direction is applied to the edge portion 33X1 of the second coil portion 33, a force F in the Z2 direction is generated at the first and second coil portions 32 and 33 based on the Fleming's left hand rule. It is noted that the other electromagnetic drive mechanisms 30X2, 30Y1-1, 30Y1-2, 30Y2-1, and 30Y2-2 are arranged to operate in a similar manner. According to the present example, the force F that is generated when the electromagnetic drive mechanisms 30X1~30Y2-2 operate simultaneously to move the touch panel 11 in the Z2 direction is arranged to be at least several folds greater than the force applied to the touch panel when the operator conducts a coordinates input operation.

The yoke 26 forms a part of the base member 20, and is configured such that electromagnetic forces are applied to the two coil portions 32 and 33 at the electromagnetic drive mechanisms 30. According to such an arrangement, the electromagnetic drive mechanisms 30 may be formed into a thin structure with few components while realizing generation of a large electromagnetic force.

FIGS. 6A~6E are diagrams showing a configuration of the resurfacing assisting member 40. The resurfacing assisting member 40 may be made of rubber, for example, and includes a base portion 41 at the bottom section, a drum-shaped portion 42 mounted on the base portion 41, and L-shaped arm portions 43 and 44 protruding outward to the right and to the left, respectively, from the top portion of the drum-shaped portion 42. The drum-shaped portion 42 is arranged to be hollow and its peripheral wall is arranged to bulge outward to be shaped into a drum-like structure. The tips of the L-shaped arm portions 43 and 44 are positioned higher than the bottom surface of the base portion 41 (i.e., toward the Z1 direction) by a distance of c. This distance c corresponds to the stroke length at which the touch panel may recede. The drum-shaped portion 42 of the resurfacing assisting member 40 is arranged to elastically deform in the Z1-Z2 directions. For example, when the touch panel 11 is receded, the drum-shaped portion 42 is pressed downward in the Z2 direction, in turn, the drum-shaped portion 42 thrusts the touch panel 11 upward in the Z1 direction to assist the touch panel 11 to be positioned back to its original state using the elastic force accumulated at the time of the elastic deformation. In this way, the resurfacing assisting member 40 assists the operation of restoring the touch panel 11 back to its original state to enable quick restoration of the touch panel 11.

Referring back to FIG. 1, the control unit 60 of the haptic panel apparatus 10 includes a comparator 61, a reference voltage source 62, an electronic switch 63, a drive current source Vcc, a resistor 64, a terminal 65 that is connected to one end of the coil 34, and wiring 66. It is noted that the other end of the coil 34 is connected to ground.

When the touch panel 11 is not operated, the electric potential of the wiring 66 is set to low-level, the output of the comparator 61 is set to low-level, the electronic switch 63 is turned off, and no current is supplied to the coil 34.

Referring to FIGS. 3 and 4, the haptic panel apparatus 10 of the present embodiment is arranged to be mounted to an equipment 70. According to the present example, the equipment 70 includes a LCD panel 71, a top panel 72, and a window 73 friend at the top panel 72. As is shown in the drawings, the base member 20 is arranged onto the top peripheral portion of the liquid crystal panel 71, and the top surface of the haptic panel apparatus is exposed by the window 73 of the top panel 72. The top periphery portion of the haptic panel apparatus 10 is arranged to be in contact with a seal member 80 that is provided around the rim of the window 73 of the top panel 72. In this way, the window 73 may be sealed.

Figure 7:
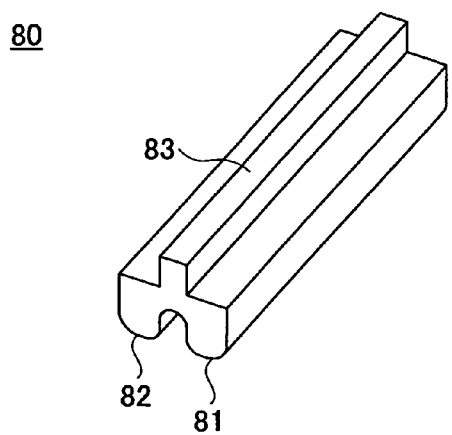
FIG. 7 is a diagram showing a configuration of a portion of a seal member shown in FIG. 2.

FIG. 7 shows a configuration of the seal member 80 according to the present embodiment. It is noted that the seal member 80 may be made of rubber, for example. As is shown in this drawing, the bottom portion of the seal member 80 is arranged to have two protruding portions 81 and 82 that have semicircular cross-sectional shapes. The top portion of the seal member 80 is arranged to have one protruding portion 83. As is shown in FIGS. 3 and 4, the top protruding portion 83 of the seal member 80 is engaged into a trench formed at the top panel 72, and the bottom protruding portions 81 and 82 are arranged to be in contact with the top surface of the touch panel 11 at a position corresponding to the position of the top surface of the peripheral rim 23. It is noted that the linear contact as opposed to planar contact is realized between the top surface of the touch panel and the seal member 80. In this way, an effective seal may be achieved between the haptic panel apparatus 10 and the window 73 of the top panel 72 of the equipment 70 so as to provide effective protection against dust and water infiltration.

In the following, operations of the haptic panel apparatus 10 are described.

When the touch panel 11 is not operated, the haptic panel apparatus 10 may be in a state as is shown in FIGS. 3 and 4, for example. That is, the height of the touch panel 11 is set to h1. The LCD panel 71 is driven to display a screen, and the screen is displayed within the window 73 of the equipment 70 through the touch panel 11.

Figure 8A:
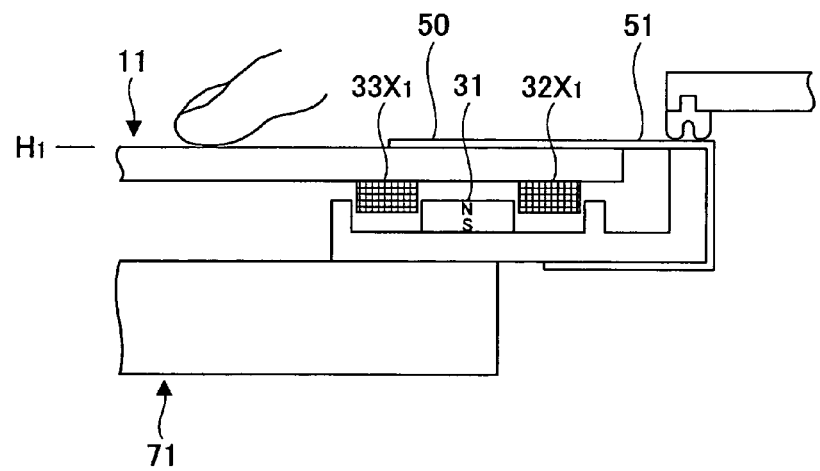
FIGS. 8A and 8B are diagrams illustrating a case in which an operator conducts a coordinates input operation.
Figure 8B:
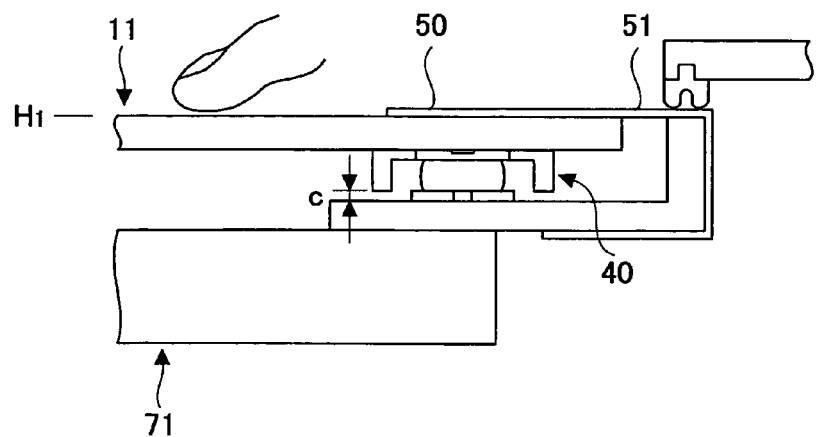

FIG. 8A and 8B illustrate a case in which an operator touches a specific spot on the touch panel 11 with his/her finger tip and lightly presses the spot. The touch panel 11 is maintained at the height h1 by the overhanging portion 51, and in this way, coordinate input operations may be suitably conducted. When the upper plate of the touch panel 11 comes into contact with the lower plate, the potential of the wiring 66 shown in FIG. 1 is increased, and the coordinates detection unit 90 detects the X axis and Y axis coordinates and supplies the detection result to a processing unit so that processes such as command recognition may be realized.

Also, at the control unit 60, the output of the comparator 61 is switched to high-level, the electronic switch 63 is turned on, and a drive current i is output from the terminal 65. In turn, the drive current i is supplied to the coil 34 so that the current flows in a counter-clockwise direction in the first coil portion 32 and in a clockwise direction in the second coil portion 33.

Referring to FIGS. 5C and 5D showing the electromagnetic drive mechanism 30X1, when the touch panel 11 is operated as is described above, the current i is arranged to flow in the Y1 direction within the first coil portion 32 and current i is arranged to flow in the Y2 direction within the second coil portion 33. Based on Fleming's left hand rule, an electromagnetic force F in the Z2 direction is generated at both the first and second coil portions 32 and 33. It is noted that the other electromagnetic drive mechanisms 30X2~30Y2-2 also operate in a similar manner.

Figure 9A:
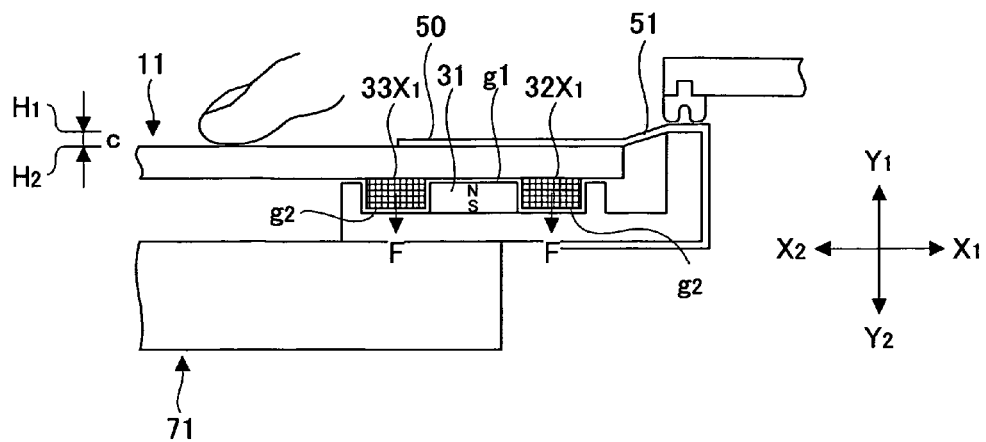
FIGS. 9A and 9B are diagrams illustrating states of the haptic panel apparatus right after an input is made.
Figure 9B:
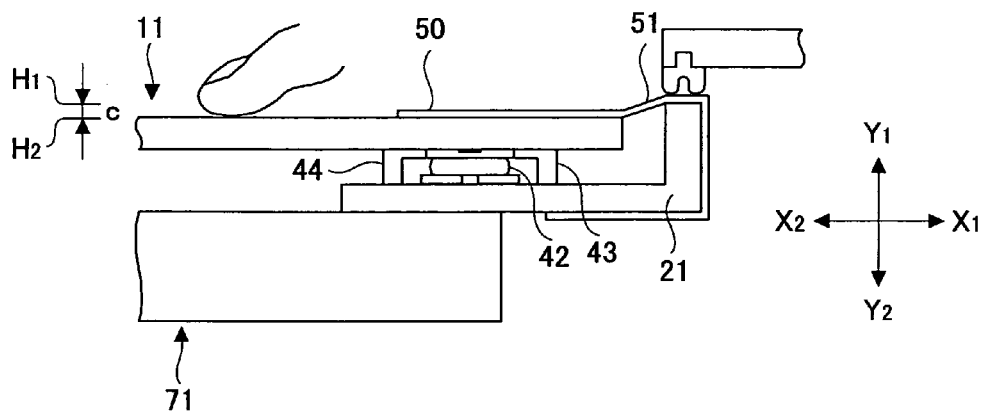

FIGS. 9A and 9B illustrate a case in which the touch panel 11 recedes in the Z2 direction to be positioned at height h2 in response to the coordinates input operation made by the operator as is described above. As is shown in FIG. 9A, the coil portions 32 and 33 moves closer to the bottom of the trenches 27 and 28, and as is shown in FIG. 9B, the resurfacing assisting member 40 is pushed in the Z2 direction to be elastically deformed. It is noted that the touch panel 11 is arranged to be unresponsive to the force applied thereto by the finger tip of the operator but is arranged to recede in response to the force F generated at the first and second coil portions 32 and 33. In this way, the operator of the apparatus may be able to recognize that the coordinates input has been properly received by detecting the receded touch panel 11 with his/her finger tip. According to the present embodiment, even visually-impaired persons may be able to recognize that an input operation has been successfully conducted at the apparatus.

It is noted that by arranging the electromagnetic drive mechanisms 30X1~30Y2-2 at the respective edges of the touch panel 11 to operate simultaneously, the receding of the touch panel 11 may be realized smoothly while maintaining the parallel positioning of the touch panel 11 with respect to the X-Y plane.

When the operator moves his/her finger tip away from the touch panel 11, the output of the comparator 51 is switched back to low-level, the electronic switch 53 is turned off, the supply of the drive current i is stopped, the generation of the force F is stopped, and the receded portion of the touch panel 11 is stretched out by the stretching force in the X and Y directions of the overhanging portion 51 provided around the periphery of the touch panel 11 and is thrust upward by the elastic force of the resurfacing assisting members 40 provided at the four corners of the touch panel 11 so that the touch panel 11 may be quickly restored to its original position at height h1. Thus, the touch panel 11 may be positioned at height h1 when a next operation is conducted on the touch panel 11 by the operator.

As is shown in FIG. 9B, in the receding operation of the touch panel 11, the resurfacing assisting member 40 is pushed downward until the tips of the L-shaped arm portions 43 and 44 come into contact with the top surface of the frame portion 21 of the base member 20. In other words, the stroke length at which the touch panel recedes is determined by the structure of the resurfacing assisting member 40, and thereby, the stroke length of the touch panel 11 maybe accurately determined. As is shown in FIG.9A, when the touch panel 11 is in a receded position, a gap g1 is provided between the touch panel 11 and the permanent magnet 31, and gaps g2 are provided between the edge portions 32X1 and 33X1 of the first and second coil portions 32 and 33, and the bottom surfaces of the trenches 26 and 27, respectively. In this way, the permanent magnet 31 and the first and second coils 32 and 33 are prevented from coming into contact with other elements and being damaged.

It is noted that in an alternative embodiment, the direction of the drive current flowing in the first and second coil portions 32 and 33 maybe arranged to be opposite to the directions described above, in which case the touch panel is arranged to protrude upward in the Z1 direction in response to an operation made on the touch panel by the operator.

In the following, modified examples of the resurfacing assisting member 40 and the seal member 80 are described.

Figure 10A:
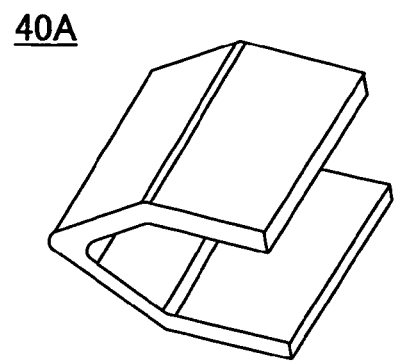
FIGS. 10A and 10B are diagrams showing modified examples of the resurfacing assisting member.
Figure 10B:
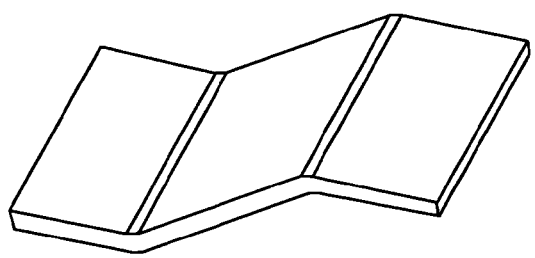

FIGS. 10A and 10B are diagrams illustrating configurations of resurfacing assisting members 40A and 40B as modified exampled of the resurfacing assisting member 40. The resurfacing assisting members 40A and 40B shown in the drawings are plate members that are configured to generate a force for thrusting the touch panel 11 upward upon being deformed. According to an embodiment, the resurfacing assisting member 40A or 40B may be used in place of the resurfacing assisting member 40 described above.

FIGS. 11A~11E are diagrams showing exemplary configurations of seal members 80A~80E. According to an embodiment, one of the seal members 80A~80E may be used in place of the seal member 80 described above.

Second Embodiment

In the following a haptic panel apparatus according to a second embodiment of the present invention is described.

Figure 12:
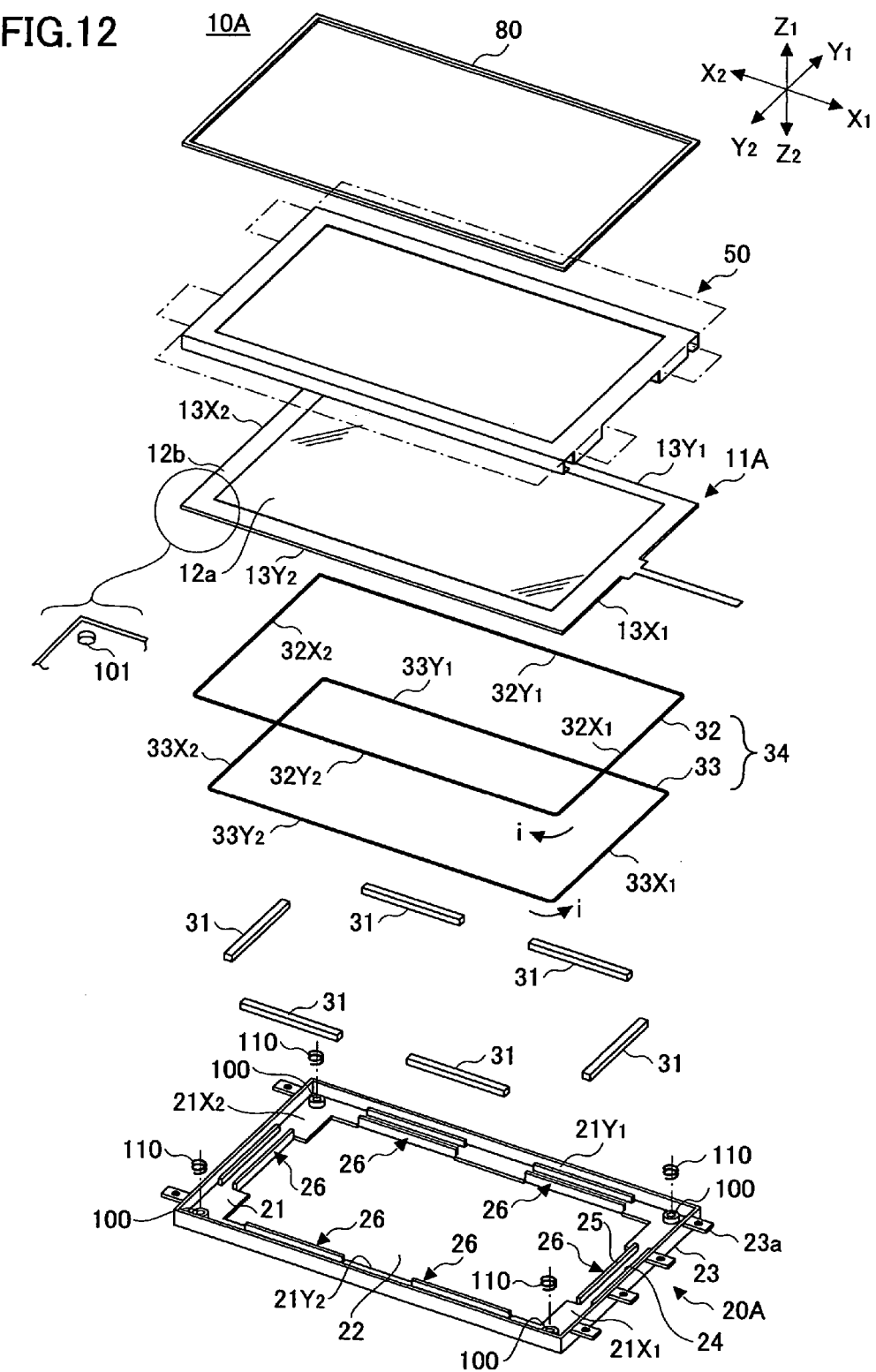
FIG. 12 is an exploded perspective view of a haptic panel apparatus according to a second embodiment of the present invention.
Figure 13:
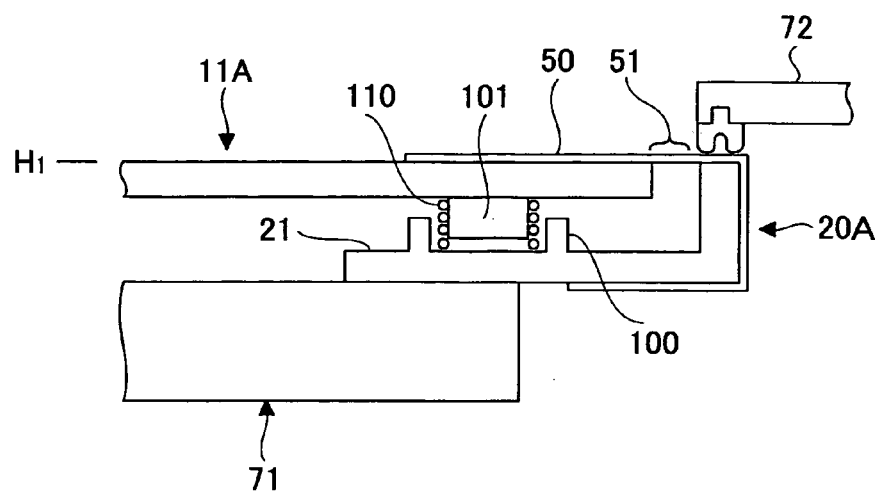
FIG. 13 is a cross-sectional view of a planar direction moving prevention mechanism of the haptic panel apparatus of FIG. 12.
Figure 14A:
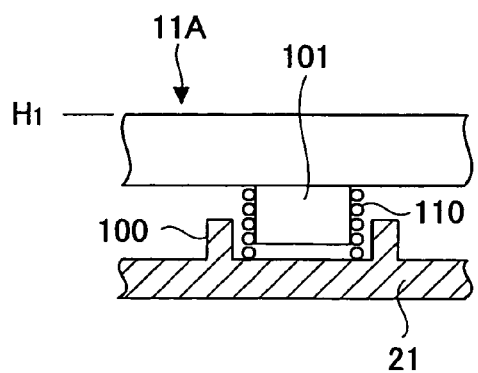
FIGS. 14A and 14B are cross-sectional views showing states of the planar direction moving prevention mechanism of FIG. 13.
Figure 14B:
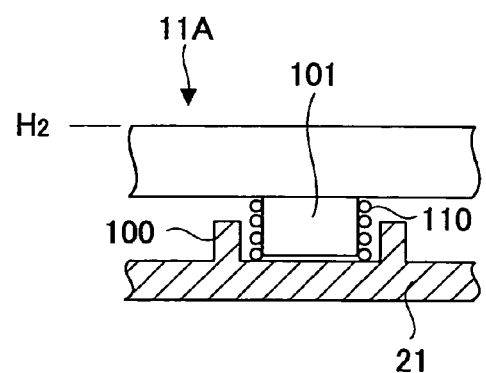

FIG. 12 is an exploded perspective view of the haptic panel apparatus 10A according to the second embodiment. FIG. 13 is a cross-sectional view of a corner portion of the haptic panel apparatus 10A. FIGS. 14A and 14B are cross-sectional views of a section of the structure shown in FIG. 13. FIG. 15 is an exploded perspective view of the structure shown in FIG. 13.

It is noted that, aside from its corner portions, the haptic panel apparatus 10A of the second embodiment has a configuration generally identical to that of the haptic panel apparatus 10 of the first embodiment as is illustrated in FIGS. 1~4. Accordingly, in FIG. 12, elements of the haptic panel apparatus 10A that are identical to those of the haptic panel apparatus 10 of FIG. 2 are assigned the same numerical references and their descriptions are omitted.

The haptic panel apparatus 10A of the present embodiment does not include the resurfacing assisting member 40 of FIG. 2. Instead, the haptic panel apparatus 10A includes a tube member 100 that is formed at each corner of the top surface of the frame portion 21 of a base member 20A as an integral portion of the frame portion 21, and a cylinder member 101 that is formed at each corner of the bottom surface of a touch panel 11A. The tube member 100 and the cylinder member 101 are positioned between the base member 20A and the touch panel 11A and are arranged to be slidably engaged with each other. When the cylinder member 101 is engaged into the tube member 100, the touch panel 11 is prevented from moving in the X-Y plane directions with respect to the base member 20A. Thus, the tube member 100 and the cylinder member 101 in such an engaged state realize a planar direction movement prevention mechanism of the present embodiment. Also, it is noted that a coil spring 110 is provided between the tube member 100 and the cylinder member 101, the coil spring 110 functioning as the resurfacing assisting member 40 of the first embodiment.

By arranging the cylinder member 101 to engaged with the tube member 100 at each corner portion of the touch panel 11A, an effective mechanism may be realized for preventing the touch panel 11A from moving in the X-Y plane directions with respect to the base member 20A. FIG. 14B is a cross-sectional view illustrating a case in which the touch panel 11A is in a receded state in response to the operation of the electromagnetic drive mechanism 30 (see FIG. 1). When the touch panel 11A recedes, the cylinder member 101 is guided by the tube member 100 to move within the tube member 100. When the electromagnetic drive mechanism stops its operation, the touch panel is returned back to its original position by the spring force of the coil spring 110 that guides the cylinder member 101 within the tube member 100 to move in the Z1 direction.

According to the present embodiment, the receding and resurfacing operation of the touch panel 11A may be effectively realized even in a case where the haptic panel apparatus 10A is positioned vertically so that the touch panel 11A is arranged to move sideways as opposed to up-down directions, for example.

It is noted that in an alternative embodiment, the tube member 100 may be formed on the touch panel 11A side, and the cylinder member 101 may be formed on the base member side.

Third Embodiment

In the following a haptic panel apparatus according to a third embodiment of the present invention is described.

Figure 16:
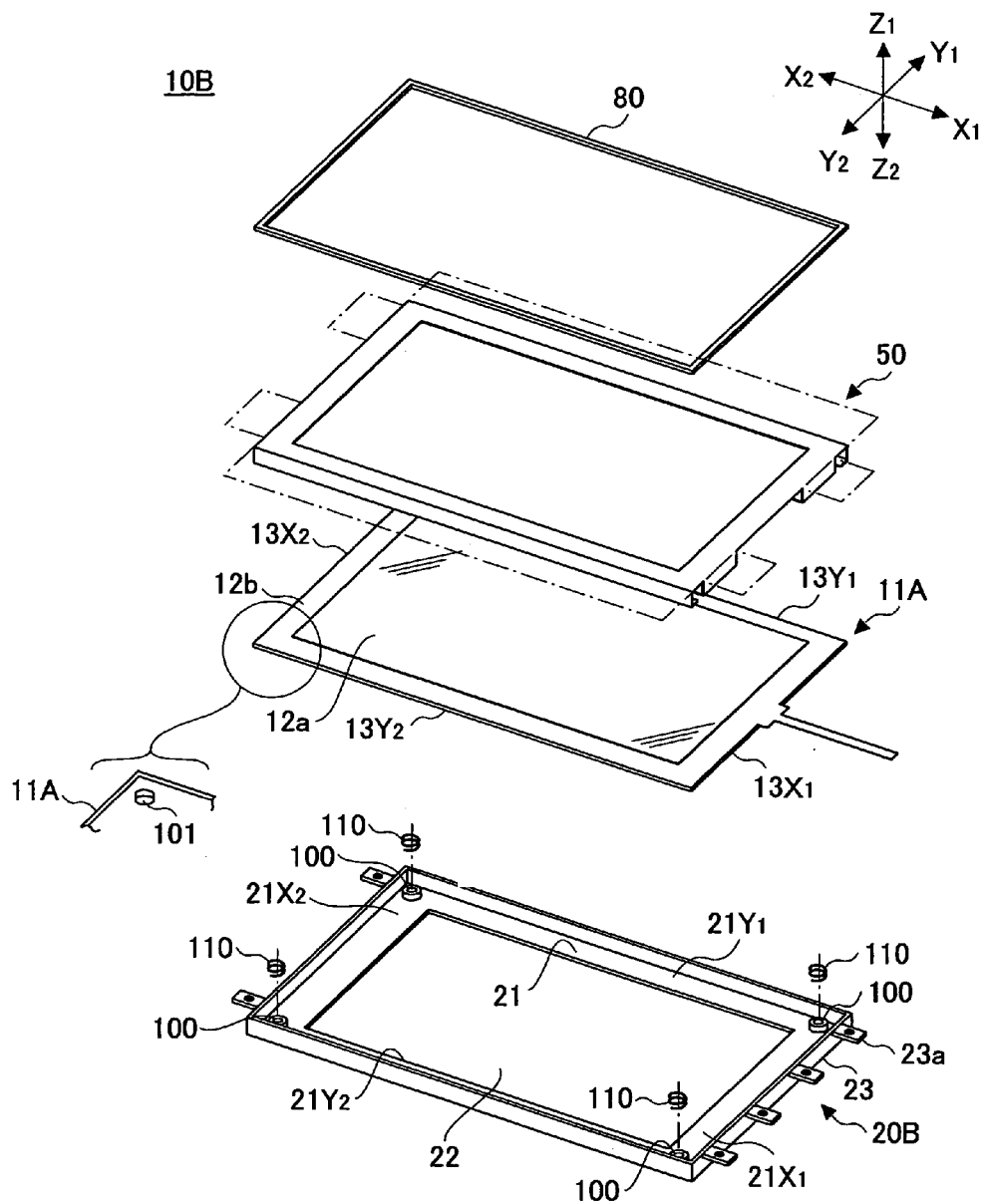
FIG. 16 is an exploded perspective view of a haptic panel apparatus according to a third embodiment of the present invention.
Figure 17:
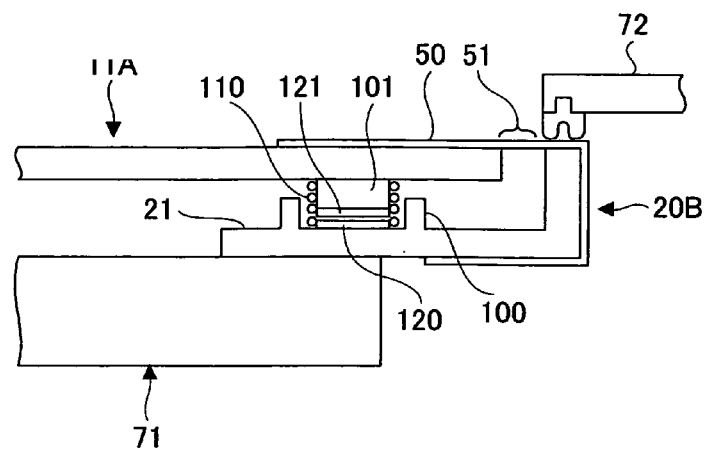
FIG. 17 is a cross-sectional view of a planar direction moving prevention mechanism of the haptic panel apparatus of FIG. 16.
Figure 18A:
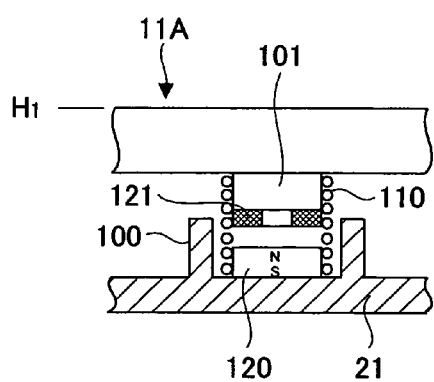
FIGS. 18A and 18B are cross-sectional views showing states of the planar direction moving prevention mechanism of FIG. 17.
Figure 18B:
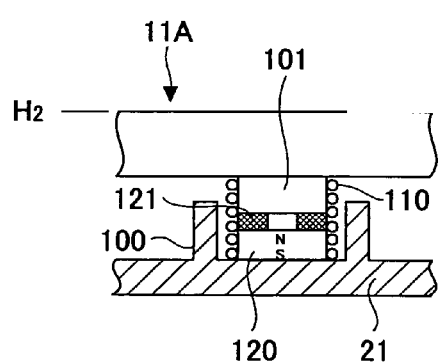

FIG. 16 is an exploded perspective view of the haptic panel apparatus 10B according to the third embodiment. FIG. 17 is a cross-sectional view of a corner portion of the haptic panel apparatus 10B. FIGS. 18A and 18B are cross-sectional views of a portion of the structure shown in FIG. 17. FIG. 19 is an exploded perspective view of a portion of the structure of FIG. 17.

According to the present embodiment, the electromagnetic drive mechanism 30 as is described in the previous embodiments is embedded into the tube member 100 as is described in relation to the second embodiment. It is noted that in FIGS. 16~19, components that are identical to those shown in FIGS. 12~15 are assigned the same numerical references.

As is shown in FIG. 16, a base member 20B of the haptic panel apparatus 10B of the present embodiment differs from the base member 20A of the haptic panel apparatus 10A in that it does not include the ribs 24 and 25. Also, it is noted that the permanent magnets 31 and the coil 34 are not mounted on the base member 20B.

According to the present embodiment, a disc-shaped permanent magnet 120 that has magnetic poles arranged in its thickness directions is stationed at the bottom of the tube member 100, and a coil 121 is stationed at the bottom surface of the cylinder member 101. The tube member 100 and the cylinder member 101 are arranged between the base member 20A and the touch panel 11A, wherein the cylinder member 101 is slidably engaged into the tube member 100, and the coil spring 110 is engaged into the tube member 100. In this way, the coil 121 and the permanent magnet 120 are arranged to face against each other.

According to the present embodiment, the coil 121 and the permanent magnet 120 facing against each other realize an electromagnetic drive mechanism that relies upon an electromagnet.

When an operator touches the touch panel 11A and slightly presses the touch panel 11A to conduct a coordinates input operation, a drive current flows into the permanent magnet 121 and the coil 121 turns into an electromagnet that is attracted to the permanent magnet 120. Accordingly, as is shown in FIG. 18B, the cylinder member 101 compresses the coil spring 110 while being guided by the tube member 100 to move toward the Z2 direction to induce the touch panel 11A to recede.

When the operator moves his/her finger tip away from the touch panel 11A, the supply of the drive current is stopped, and the touch panel 11A is moved back to its original position by the spring force of the coil spring 110 that moves the cylinder member 101 guided by the tube member 100 toward the Z1 direction.

In this way, the receding and resurfacing operations of the touch panel 11A of the haptic panel apparatus 1OB may be effectively realized even in a case where the haptic panel apparatus 10B is positioned vertically.

Further, it is noted that the present invention is not limited to the specific embodiments described above, and variations and modifications may be made without departing from the scope of the present invention. For example, the present invention is not limited to using the touch panel 11 or 11A as is described above, and other forms of coordinate input panels may equally be used in alternative embodiments of the present invention.

The present application is based on and claims the benefit of the earlier filing date of Japanese Patent Application No. 2004-336491 filed on Nov. 19, 2004, the entire contents of which are hereby incorporated by reference.

What is claimed is:

1. A haptic panel apparatus, comprising:
a panel having a surface that is physically operated by an operator upon conducting an input operation;
a base member that is arranged at a rear face side of the panel, the base member including a bottom frame portion surrounding a periphery of the panel and a plurality of pairs of rib portions integrally protruding from a plurality of sections of the bottom frame portion; and
a drive mechanism that operates when the input operation is conducted on the panel, and is configured to drive the panel to move in a perpendicular direction with respect to the surface of the panel;
wherein the drive mechanism includes the pairs of rib portions as yoke portions, a plurality of permanent magnets that are arranged between the rib portions of the pairs of rib portions, and a pair of concentric coil portions surrounding the periphery of the panel and being arranged between the rib portions of the pairs of rib portions, the permanent magnets and the yoke portions being configured to produce magnetic fields around said pair of concentric coil portions; and
a drive current is supplied to the coil in response to the input operation being conducted on the panel.

2. A haptic panel apparatus, comprising:
a rectangular panel having a front surface that is physically operated by an operator upon conducting an input operation;
a rectangular frame-shaped base member that is arranged at a rear surface side of the panel, the base member including bottom frame portion surrounding a periphery of the panel and a plurality of pairs of rib portions integrally protruding from a plurality of sections of the bottom frame portion;
a tape that stretches across an outer periphery portion of the front surface of the panel and the peripheral rib portion of the base member, and supports the panel that is suspended with respect to the base member by pulling the panel outward in a planar direction of the panel;
a drive mechanism that is operated when the input operation is conducted on the panel, and is configured to drive the panel to move in a direction toward the base member; and
a panel restoration assisting member that elastically deforms when the panel moves in the direction toward the base member and accumulates an elastic force, the panel restoration assisting member being configured to use the accumulated elastic force to assist in restoring the panel back to an original position when the operation of the drive mechanism is ended;
wherein the drive mechanism includes the pairs of rib portions as yoke portions, a plurality of permanent magnets that are arranged between the rib portions of the pairs of rib portions, and a pair of concentric coil portions surrounding the periphery of the panel and being arranged between the rib portions of the pairs of rib portions, the permanent magnets and the yoke portions being configured to produce magnetic fields around said pair of concentric coil portions; and a drive current is supplied to the coil in response to the input operation being conducted on the panel.

3. The haptic panel apparatus as claimed in claim 2, further comprising:

a planar direction movement prevention mechanism that is configured to prevent movement of the panel in a planar direction with respect to the base member.

4. The haptic panel apparatus as claimed in claim 2, wherein:

the permanent magnets and the yokes are configured to generate a first magnetic field and a second magnetic field at first sides and second sides of the permanent magnets, respectively, the first and second magnetic fields having magnetic fluxes acting in opposite directions with respect to each other;

the coil includes a first coil portion and a second coil portion that are interconnected and are wound in opposite directions with respect to each other;

the first coil portion is arranged across the first magnetic fields, and the second coil portion is arranged across the second magnetic fields; and when the input operation is conducted on the panel, the drive current is supplied to the first coil portion and the second coil portion in a manner such that the drive current flows in opposite directions at the first coil portion and the second coil portion, and a force inducing the panel to move in the direction toward the base member is generated at the first coil portion and the second coil portion.

5. The haptic panel as claimed in claim 2, wherein:

the panel restoration assisting member is deformed into a compressed state when the panel moves in the direction toward the base member, and includes an element designed to define a limit to the deformation of the panel restoration assisting member; and the element of the panel restoration assisting member determines a stroke length of the movement of the panel in the direction toward the base member.

6. The haptic panel apparatus as claimed in claim 3, wherein:

the planar direction movement prevention mechanism includes a tube member and a cylinder member that are engaged with each other, the tube member being arranged on one of surfaces of the panel and the base member facing against each other, and the cylinder member being arranged on the other one of the surfaces of the panel and the base member facing against each other.

7. The haptic panel apparatus as claimed in claim 6, wherein:

one of the permanent magnets is stationed at a bottom portion of the tube member, and a portion of the coil is stationed at a tip portion of the cylinder member.

8. The haptic panel apparatus as claimed in claim 2, further comprising:

an equipment into which the panel, the drive mechanism, the panel restoration assisting member, and the base member are incorporated, the equipment including a top panel having an opening, and a seal member that is arranged around a periphery portion of the opening and is designed to come into linear contact with a periphery portion of the front surface of the panel.

* * * * *